US012129686B2

(12) United States Patent

Bossi et al.

(10) Patent No.: US 12,129,686 B2
(45) Date of Patent: Oct. 29, 2024

(54) SECURE LOCKING DEVICE, PARTICULARLY FOR A PIECE OF LUGGAGE

(71) Applicant: DELSEY, Paris (FR)

(72) Inventors: Pierre Bossi, Frasne (FR); Cyril Olivieri, Le Perreux sur Marne (FR)

(73) Assignee: DELSEY, Paris (FR)

( * ) Notice: Subject to any disclaimer, the term of this patent is extended or adjusted under 35 U.S.C. 154(b) by 342 days.

(21) Appl. No.: 17/628,493

(22) PCT Filed: Jul. 16, 2020

(86) PCT No.: PCT/FR2020/051285

§ 371 (c)(1),
(2) Date: Jan. 19, 2022

(87) PCT Pub. No.: WO2021/014077

PCT Pub. Date: Jan. 28, 2021

(65) Prior Publication Data

US 2022/0251883 A1 Aug. 11, 2022

(30) Foreign Application Priority Data

Jul. 23, 2019 (FR) ...................................... 1908361

(51) Int. Cl.
*E05B 65/52* (2006.01)
*A44B 19/30* (2006.01)
(Continued)

(52) U.S. Cl.
CPC ........ *E05B 65/5246* (2013.01); *A44B 19/301* (2013.01); *A45C 13/103* (2013.01); *E05B 37/0055* (2013.01); *E05B 37/02* (2013.01)

(58) Field of Classification Search
CPC ...... E05B 13/001; E05B 17/14; E05B 17/145; E05B 17/18; E05B 17/186;
(Continued)

(56) References Cited

U.S. PATENT DOCUMENTS 4,366,684 A 1/1983 Bako et al.
5,689,979 A * 11/1997 Yu ...................... E05B 65/5261 70/68

(Continued)

FOREIGN PATENT DOCUMENTS

CN 108825003 A * 11/2018
DE 29606359 8/1997

(Continued)

OTHER PUBLICATIONS

EP 1042972 A1 machine translation (Year: 2000).*
International Search Report dated Oct. 27, 2020.

*Primary Examiner* — Christine M Mills
*Assistant Examiner* — Christopher F Callahan
(74) *Attorney, Agent, or Firm* — IPSILON USA, LLP

(57) ABSTRACT

The invention relates to a zipper device comprising a slider provided with a pull tab (113) having a locking eyelet at its end; a lock comprising locking means able to engage with the eyelet of the pull tab so as to secure and release said eyelet from the lock. The lock comprises a cover (220) that is movable between a closed position and an open position, capable of covering, in the closed position, the end of the pull tab secured to the lock, and of uncovering this end in the open position, the cover being locked in the closed position when the pull tabs are locked in the lock. The invention also relates to a piece of luggage provided with such a zipper device.

8 Claims, 7 Drawing Sheets

(51) Int. Cl.
*A45C 13/10* (2006.01)
*E05B 37/00* (2006.01)
*E05B 37/02* (2006.01)

(58) Field of Classification Search
CPC ............. E05B 37/0031; E05B 37/0034; E05B 37/0041; E05B 65/5269; E05B 65/5276; A44B 19/301; A45C 13/103
See application file for complete search history.

(56) References Cited

U.S. PATENT DOCUMENTS

| | | | | |
|---|---|---|---|---|
| 2008/0060400 | A1* | 3/2008 | Ling | E05B 37/14 70/389 |
| 2013/0091906 | A1* | 4/2013 | Chen | E05B 65/52 70/68 |
| 2018/0279735 | A1 | 10/2018 | Paul et al. | |

FOREIGN PATENT DOCUMENTS

| | | | | | |
|---|---|---|---|---|---|
| DE | 102014019015 | | | 6/2016 | |
| EP | 1042972 | | | 10/2000 | |
| EP | 1042972 | A1 | * | 10/2000 | A44B 19/301 |
| FR | 2650490 | | | 2/1991 | |
| GB | 1173315 | A | | 12/1969 | |
| JP | 2013221357 | A | * | 10/2013 | A45C 13/103 |
| WO | WO-2013037912 | A1 | * | 3/2013 | A45C 13/10 |
| WO | WO-2017203472 | A1 | * | 11/2017 | E05B 15/10 |

* cited by examiner

[Fig. 1]
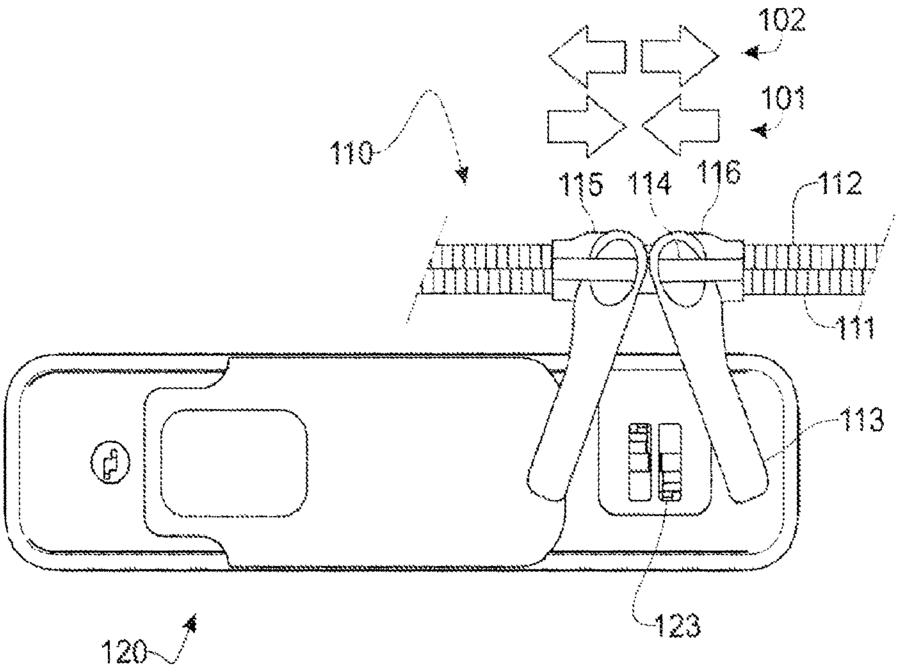
[Fig. 2]
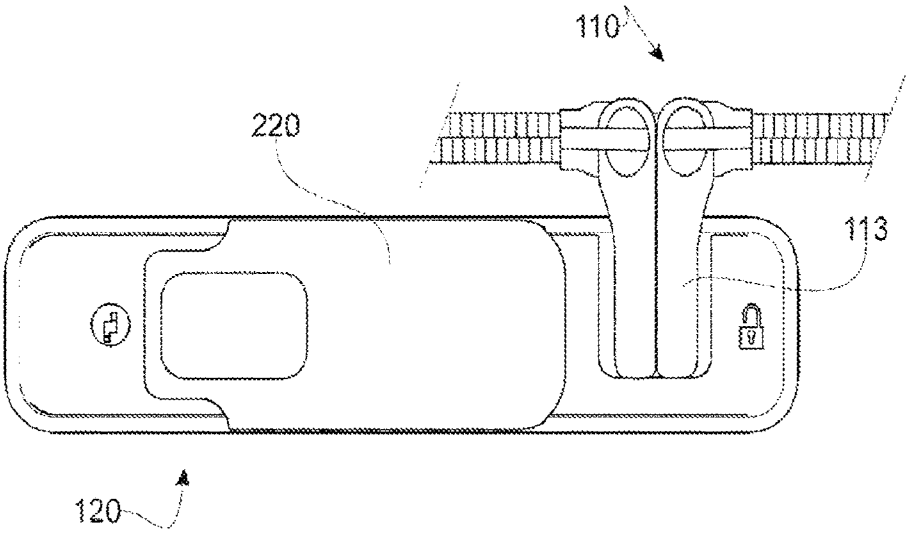

[Fig. 3]
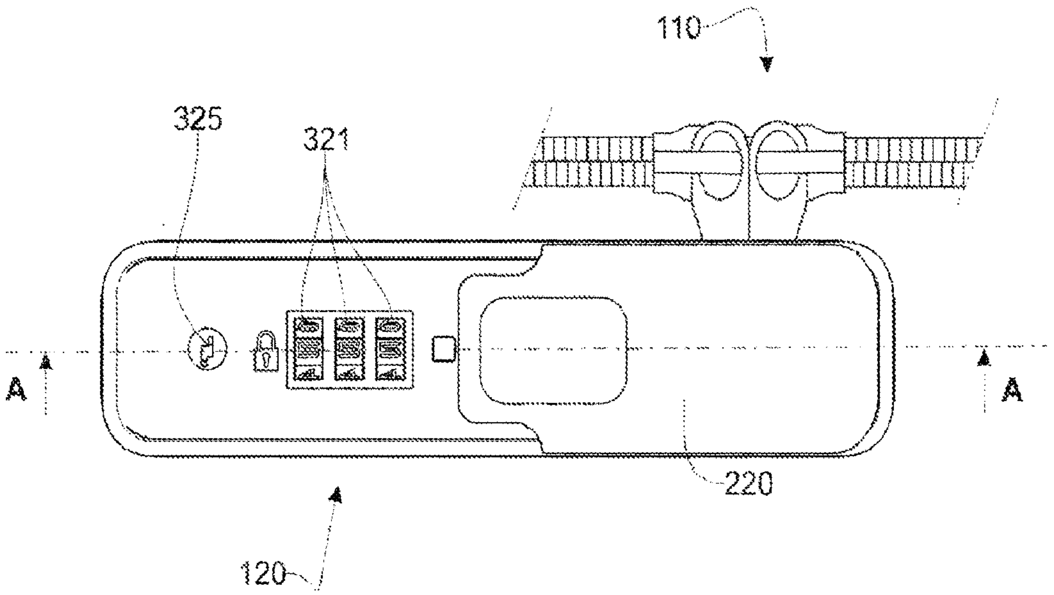
[Fig. 4]
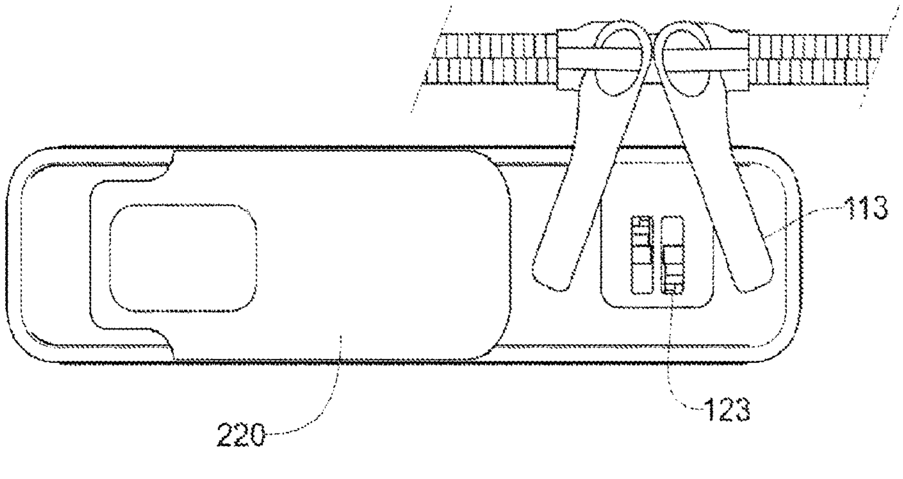

[Fig. 5]
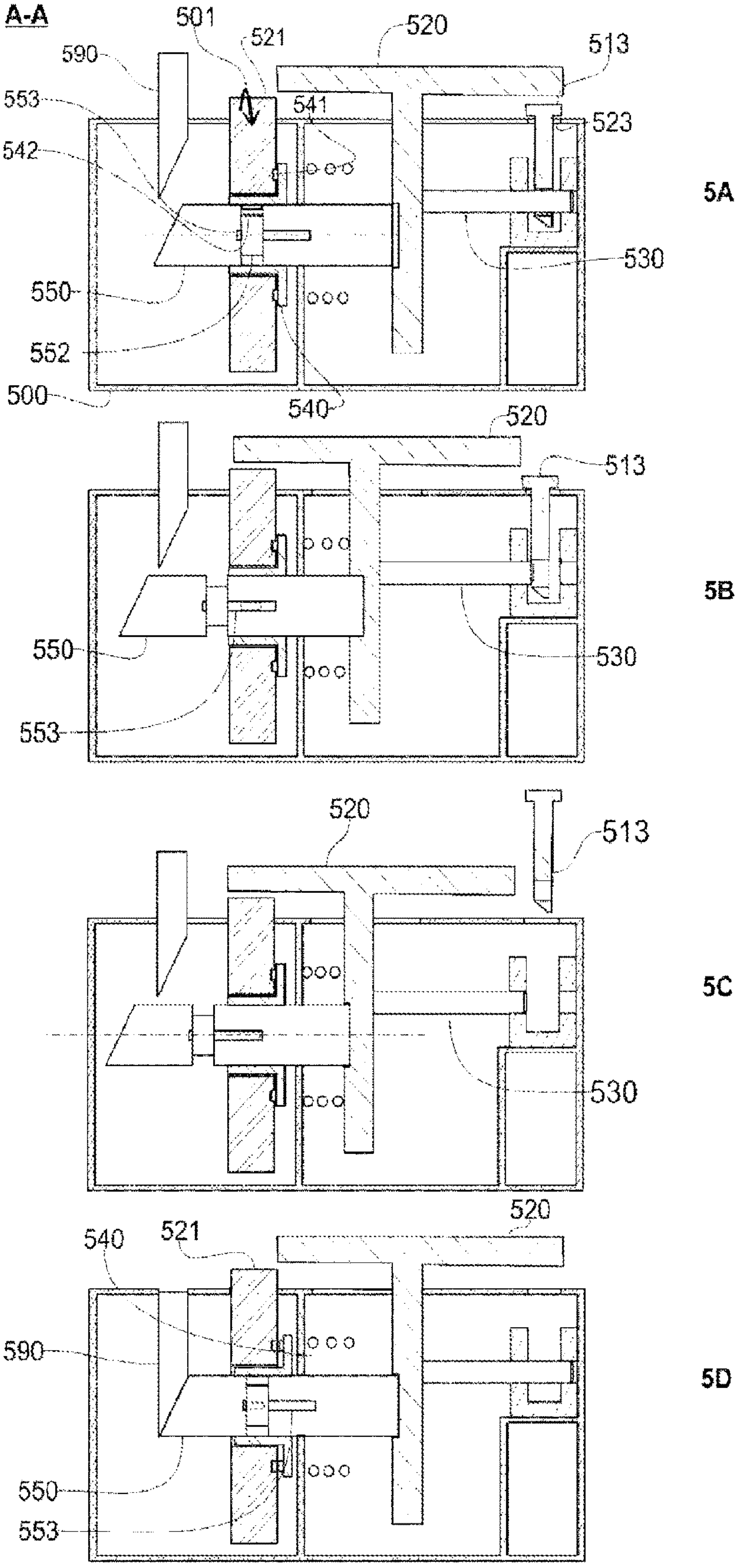

[Fig. 6]
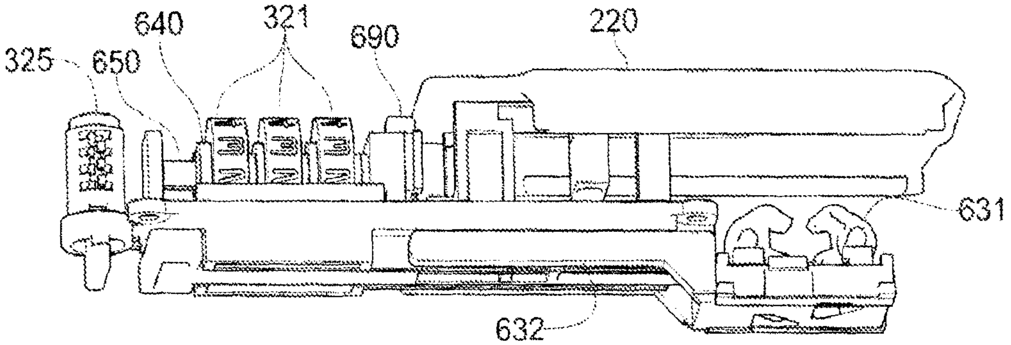
[Fig. 7]
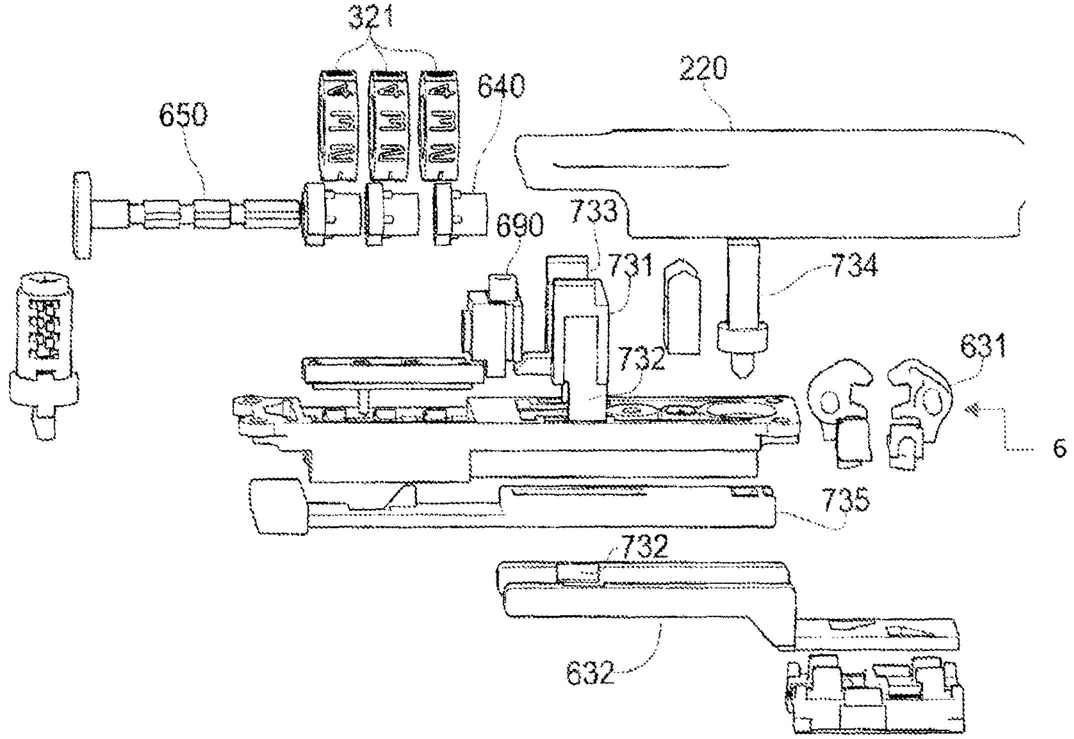

[Fig. 8]
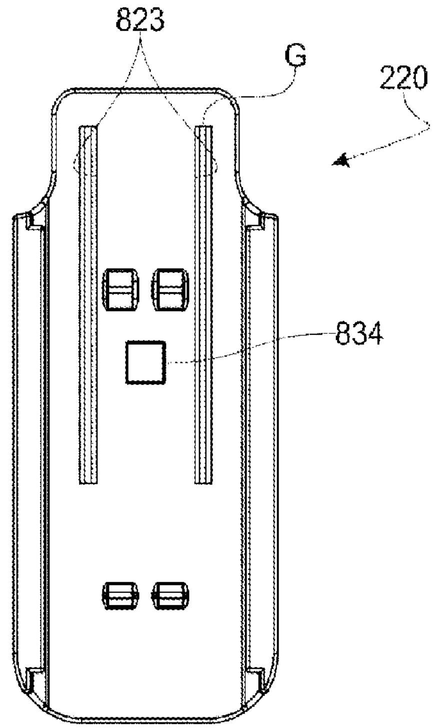
[Fig. 9]
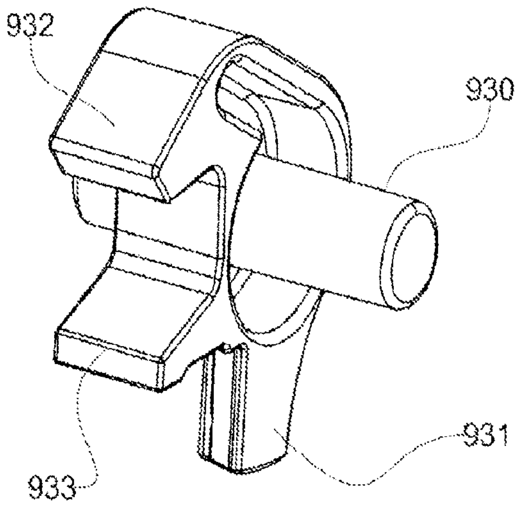

[Fig. 10]
10A
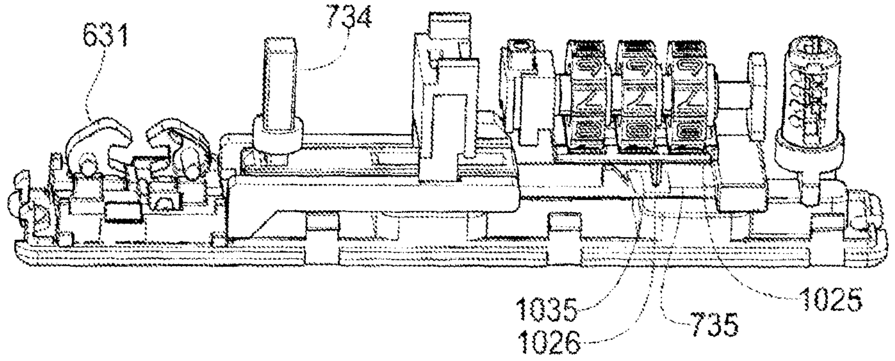
10B
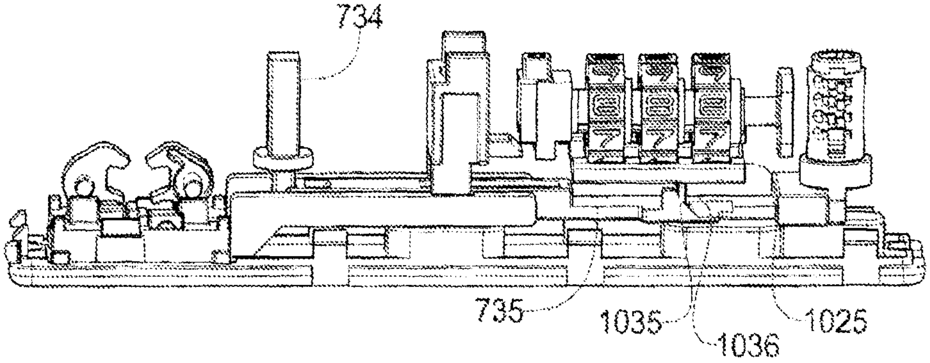

[Fig. 11]
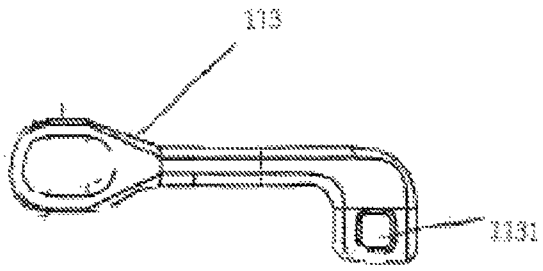

SECURE LOCKING DEVICE, PARTICULARLY FOR A PIECE OF LUGGAGE

RELATED APPLICATION

This application is a National Phase of PCT/FR2020/051285 filed on Jul. 16, 2020, which claims the benefit of priority from French Patent Application No. 19 08361, filed on Jul. 23, 2019, the entirety of which are incorporated by reference.

TECHNICAL FIELD

The invention belongs to the field of locks for zip fasteners.

This type of lock which blocks the pull tabs of said fasteners is more particularly, although not exclusively, used in the field of luggage.

PRIOR ART

Zip fasteners, or zippers, are advantageously used as fasteners for closing bags and suitcases of all kinds.

A zip fastener comprises two rows of teeth, or chains, which are each connected to a flexible support, each of said flexible supports being fixed to one of the elements of the bag or of the suitcase, and the joining together of which achieves the fastening.

A slider is engaged on the two rows of teeth and moving this slider along said rows allows the teeth to be connected or separated, depending on the direction in which the slider is moved, thus allowing the piece of luggage to be fastened or opened.

The slider is manipulated using a pull tab secured to said slider by a ring.

On most pieces of luggage, the zip fastener comprises two sliders engaged on the chains, in opposite directions, so that moving either one of the two sliders toward the other slider, which is to say when this movement tends to cause the sliders to come close to one another, the teeth of the chains interconnect, fastening the piece of luggage, whereas when the movement of one of the sliders with respect to the other has a tendency to cause the two sliders to move further apart, the teeth of the chains disconnect, allowing opening.

In a known way, this type of zip fastener with two sliders comprises a locking device which, when implemented, prevents the piece of luggage from being opened.

This locking device consists in securing the pull tabs of the two sliders to one another once the piece of luggage has been closed and the two sliders have been aligned against one another.

In this way, the two sliders can move only as one and it becomes impossible to move one or other of the sliders in such a way as to move it away from the other in order to bring about an opening.

This locking is for example obtained by inserting the shackle of a padlock into eyelets present at the ends of the pull tabs, or by inserting the eyelets of the pull tabs into a lock located at a fixed location on one of the walls of the piece of luggage. In that case, it is quite simply no longer possible to move said sliders when they have been locked.

These locking devices are very widespread and prevent quick and simple opening of the piece of luggage when the latter is locked.

Nevertheless, these devices of the prior art have a number of vulnerabilities with regard to malevolent attempts at opening.

A first vulnerability lies with the zip fastener itself.

Once closed, it can be opened without manipulating a slider by inserting a pointed object between the teeth of the chains.

This vulnerability is resolved by using a zip fastener that has two superposed chains, as described in document EP 2 421 403.

Another vulnerability lies at the junction between the pull tab and the slider.

Thus, when the ends of the pull tabs are inserted in a lock fixed to one of the walls of the piece of luggage, these pull tabs may be detached from the sliders by opening or breaking the rings that connect them thereto, for example by levering them with a screwdriver or any other rigid means.

This vulnerability is resolved by reinforcing the pull tabs and their connections to the sliders, as described in document WO 2019/020174.

Still in the event that, for locking, the ends of the pull tabs are inserted in a lock fixed to a wall of the piece of luggage, a third vulnerability concerns the possibility of tearing said ends of the pull tabs out of the lock, for example by levering them using a rigid blade such as a screwdriver blade.

This action causes the pull-tab-end eyelets inserted into the lock to break, or else causes the pull tabs to break, and in each case the sliders are then no longer held in the lock and can be manipulated.

An experienced individual can take advantage of one of these three vulnerabilities to perform malevolent opening in just a few seconds.

Now, while numerous pieces of luggage are protected against the first two vulnerabilities, the prior art solutions aimed at addressing the third and which essentially consist in improving the strength of the pull tabs are not entirely effective.

SUMMARY OF THE INVENTION

The invention seeks to address the third vulnerability set out hereinabove and to this end relates to a zip fastener device comprising at least one slider provided with a pull tab comprising a locking eyelet at its end; a lock comprising locking means able to collaborate with the eyelet of the or of at least one of the pull tabs so as to secure and release said eyelet with respect to said lock, characterized in that the lock comprises a cover able to move between a closed position and an open position and able, in the closed position, to cover the end of the or of at least one of the pull tabs secured to the lock and, in the open position, to uncover this end, said cover being locked in the closed position when the pull tab or tabs are locked in the lock.

Thus, because the ends of the pull tabs are covered by a cover, locked in position when the device is locked, it becomes very difficult, if not impossible, to access underneath the pull tabs using whatever tool in order to attempt to tear these pull tabs out of the lock.

The third vulnerability of the devices of the prior art is thus resolved.

The device that forms the subject matter of the invention also offers other advantages, beyond resolving this third vulnerability.

The invention is advantageously implemented in accordance with the embodiments and variants set out hereinafter, which are to be considered individually or in any technically viable combination.

Although the device that forms the subject matter of the invention can quite readily be achieved using a zip fastener comprising just one slider, according to a preferred embodiment, the zip fastener comprises two sliders aligned to mirror one another so that moving the two sliders toward one another causes the zip fastener to close, and the locking means of the lock are able to collaborate with the eyelets of the pull tabs of each slider, the cover in the closed position covering the ends of the two pull tabs.

Advantageously, the cover is a sliding cover configured to pass from the closed position to the open position by sliding along the lock. Thus, the cover passes from the closed position to the open position, and vice versa, by sliding along the lock.

Although the same functions can be achieved using a pivoting cover, this embodiment is more compact, more esthetically pleasing and more reliable because, since the cover is connected to the body of the lock over a significant length, it is itself very difficult to tear off using whatever tool, for example a screwdriver blade.

Advantageously, the locking means for locking the or at least one of the pull tabs comprise a latch bolt comprising a portion able to penetrate into the eyelet of the end of the pull tab and secure said pull tab to the lock.

As a preference, the latch bolt is loaded by a spring and is returned to a position of securing the pull tab to the lock.

Advantageously, the device comprises locking instigation means to instigate the blocking of the portion of the latch bolt in the eyelet of the pull tab, and the cover hides said locking instigation means from view when the cover is in the open position. The locking instigation means have a locked position and an unlocked position and the cover can be moved from the closed position to the open position when the locking instigation means are in the unlocked position. As a preference, the or at least one of the latch bolts is a rotary catch. This rotary catch has at least an engagement configuration, a locking configuration and an ejection configuration and is configured to pass from one configuration to another under the effect of the translational movement of a fork connected to the cover.

As the cover can be unlocked and moved toward its open position only if the locking instigation means are in the unlocked position, the locking instigation means are therefore hidden and their configuration cannot be modified. More particularly, when the locking instigation means are mechanical code wheels, the user has to see the valid code displayed on these means before locking the pull tabs, which means that the risks of the user forgetting the code are reduced.

Thus, according to one advantageous embodiment, the locking instigation means comprise a plurality of rotary code wheels, it being possible for the device that forms the subject matter of the invention to be unlocked by a unique combination of positions of said code wheels, known as the valid combination.

According to one embodiment of the invention, when the cover is in the closed position, in a combination of positions of the plurality of rotary code wheels other than the valid combination, the cover is blocked in position.

According to one embodiment of the invention, in the combination of positions of the plurality of rotary code wheels that corresponds to the valid combination, the cover can be moved from the closed position to the open position. The latch bolt is connected to the cover over at least part of the travel of the cover and, when the cover is driven in the cover-closed-position/cover-open-position direction, beyond a predetermined cover position, the latch bolt is completely extracted from the pull-tab-end eyelet. In this position, the pull tab is ejected from the lock.

According to one embodiment of the invention, said device comprises a slotted ejection shaft and sleeves comprising a coding lug, which is able to slide in a slot of the ejection shaft, the sleeves and the code wheels being centered with respect to the ejection shaft, said sleeves being rotationally coupled to the code wheels by a disengageable dog clutch mechanism.

This embodiment of the locking instigation means is robust and requires no power source in order to operate.

Advantageously, the device that forms the subject matter of the invention comprises a personalization button allowing the dog clutch mechanism between the sleeves and the wheels to be disengaged in order to change the valid combination, said personalization button being covered by the cover in the open position and uncovered by the cover in the closed position.

Advantageously, the device that forms the subject matter of the invention comprises blocking means for blocking the rotation of the code wheels when the cover is in the open position.

Thus, because a valid code has been displayed on the wheels in order to unlock the lock, these wheels are covered by the cover and blocked in position, thus limiting the risk of the code being forgotten on subsequent uses.

The invention also relates to a piece of luggage comprising a zip fastener device according to any one of the preceding embodiments.

BRIEF DESCRIPTION OF THE DRAWINGS

The invention is set out hereinafter according to its entirely nonlimiting preferred embodiments and with reference to FIGS. 1 to 10 in which:

FIG. 1 shows, viewed from above, one exemplary embodiment of the device that forms the subject matter of the invention in a not locked configuration;

FIG. 2 depicts the device of FIG. 1, viewed from above, and in an engaged, but not locked, configuration;

FIG. 3 depicts the device of FIGS. 1 and 2, viewed from above, in a locked configuration;

FIG. 4 shows the device of FIGS. 1, 2 and 3, viewed from above, in an ejection configuration;

FIG. 5 is a highly simplified depiction of one exemplary embodiment of the device that forms the subject matter of the invention, viewed in section as identified in FIG. 3, FIG. 5A in the locked configuration, FIG. 5B in the engaged configuration, FIG. 5C in the ejection configuration and FIG. 5D in the configuration for changing the unlocking code;

FIG. 6 is a view in perspective without the casings, from a viewpoint of looking at the front from beneath, of one exemplary embodiment of the lock of the device that forms the subject matter of the invention corresponding to FIGS. 1 to 4, in the locked configuration of FIG. 3;

FIG. 7 returns to the perspective view of FIG. 6, providing an exploded view of the assembly of the components;

FIG. 8 shows a view from beneath of one exemplary embodiment of the cover of the device that forms the subject matter of the invention;

FIG. 9 depicts, viewed in perspective, one exemplary embodiment of a catch involved in locking and ejecting the pull tabs of the device that forms the subject matter of the invention;

FIG. 10 shows the system of FIGS. 6 and 7 without the casings, viewed in perspective, FIG. 10A in the locked position, FIG. 10B in the unlocked position, with the cover open;

FIG. 11 depicts a pull tab with its locking eyelet.

WAY(S) OF CARRYING OUT THE INVENTION

In FIG. 1, according to one exemplary embodiment, the device that forms the subject matter of the invention comprises a zip fastener 110 and a lock 120.

This device allows two parts of a piece of luggage, notably a bag or a suitcase, to be joined together and disconnected using the chains 110, 111 of the zip fastener.

The lock 120 is fixed to one of the parts of the bag or of the suitcase thus assembled by the zip fastener.

The zip fastener comprises two chains of teeth 110, 111 along which two sliders 115, 116 slide.

Each slider comprises a pull tab 113 which at one of its ends has a ring passing through a bridge 114 connected to the top of one slider and connecting said pull tab to said slider.

The opposite end of the pull tab 113 has an eyelet 1131, which eyelet is able to enter a slot 123 of the lock 120.

According to this exemplary embodiment, the device comprises two sliders, two pull tabs and the lock comprises two slots which are able to accept the eyelets at the ends of the pull tabs.

In the configuration of FIG. 1, said eyelets of the pull tabs have not entered the slots 123 of the lock, and the sliders 115, 116 are free to move.

Thus, when one, or both, of the sliders are moved in a direction 101 that tends to move them closer together, the chains 111, 112 of the zip fastener come together, causing the chains to be assembled with one another, and the fastening of the bag or of the suitcase (not depicted) provided with such a device.

When one, or both, of the sliders are moved in a direction 102 that tends to move them further apart, the chains 111, 112 of the zip fastener come apart, allowing the bag or the suitcase equipped with such a device to be opened.

In FIG. 2, in order to lock the suitcase or the bag in the closed configuration, the eyelets 1131 at the ends of the pull tabs 113 are introduced into the slots of the lock.

There, locking means 6, in this instance a latch bolt (not visible in this figure) passes through said eyelets securing the pull tabs 113 to the lock 120.

In this configuration, the pull tabs are engaged but not locked, which is to say that they can be extracted from the slots as the latch bolt is not blocked in position.

The latch bolt is blocked in position by locking instigation means.

By way of nonlimiting examples, the locking instigation means consist of a lock associated with a key, of a mechanical or electronic code system, of a device that recognizes a biometric feature such as a fingerprint, or a connected means, for example connected via a wireless connection of the Bluetooth® type, that receives a code or an instruction from a smartphone.

In FIG. 2, in this configuration, said locking instigation means are hidden by a cover 220, which cover is here able to slide along the lock 120 in a direction substantially parallel to the chains of the zip fastener, according to this nonlimiting exemplary embodiment, in order to move from an open position, as depicted in this figure, to a closed position.

In FIG. 3, the cover 220 is pushed into a closed position, uncovering the locking instigation means which, according to this exemplary embodiment, consist of a mechanical code system using code wheels 321.

According to this exemplary embodiment, the device that forms the subject matter of the invention comprises a plurality of code wheels 321, generally three.

Said wheels comprise symbols, in this instance figures from 0 to 9, and can be rotated about their axis by a user of the device.

They are therefore able to define a combination of symbols authorizing unlocking.

Thus, in the configuration of the device corresponding to FIG. 3, when the symbols corresponding to the chosen combination are aligned against a reference mark, it is possible to move the cover 220 from its FIG.-3 position (closed position) to its FIG.-2 position (open position), thus uncovering the pull tabs engaged in the slots.

When a combination of symbols other than the correct combination is applied, it is impossible to move the cover 220, which is blocked.

As a result, it is not possible to uncover the pull tabs which remain held in the slots of the lock and the zip fastener 110 is locked in the closed position through the inability of the sliders to be manipulated.

In practice, according to a preferred embodiment, and as explained later on, the movement of the cover is combined with movements of the latch bolt or bolts that lock the pull tabs in their respective slot. Thus, in the open position, the cover 220 has a stable position and an unstable position in which positions it hides the locking instigation means. In the unstable position, the cover is configured to cause the latch bolts to move in the direction of ejecting the pull tabs from the slots. The unstable position of the cover extends beyond the stable open position of the cover adopted with respect to the direction of travel of the cover from the closed position toward the open position.

Advantageously, the lock of the device that forms the subject matter of the invention comprises a locking instigation means in the form of a lock 325 able to accept a standard key of TSA type, the manipulating of this lock allowing the pull tabs and the cover to be unlocked whatever the combination displayed on the wheels 321, so as, for example, to allow security personnel at airports to open the luggage in transit. The conditions relating to the operation of the cover which were described hereinabove therefore of course extend to the state in which no demands are placed on the TSA lock, namely in normal conditions of use.

In FIG. 4, according to another configuration of the device that forms the subject matter of the invention and this exemplary embodiment, starting from the configuration depicted in FIG. 3, when a valid combination is displayed on the wheels, which means to say a combination that allows unlocking, the cover is pushed so as to uncover the pull tabs engaged in their slots as far as the configuration depicted in FIG. 2, then the cover continues to be moved, with the effect of disengaging the locking latch bolt or bolts from the eyelets of the pull tabs, which pull tabs are then released. This continued movement of the cover corresponds to the unstable open position described above.

Advantageously, the device comprises return means so that, if left in the configuration of FIG. 4, the cover 220 returns to the configuration of FIG. 1.

Also, the device that forms the subject matter of the invention is able to adopt three configurations in which the pull tabs of the sliders of the zip fastener collaborate with the lock.

In the configuration of FIG. 2, known as the engaged configuration, in which the cover 220 is in a stable position covering and preventing access to the locking instigation means, and in which the slots that accommodate the pull-tab-end eyelets are uncovered, the eyelets of the pull tabs are introduced into the slots and engaged by the latch bolt without there being any locking.

In this configuration, the code wheels, according to this exemplary embodiment, are displaying a valid unlocking code.

In the configuration of FIG. 3, in which the cover 220 is pushed over the pull tabs, the latch bolt fully enters the pull-tab-end eyelets. This configuration is said to be locked as soon as the unlocking code initially displayed has been erased.

It is then no longer possible to move the cover 220 without displaying a valid code.

The configuration of FIG. 4, known as the ejection configuration, is a transient configuration allowing the pull tabs to be released. The passage from the configuration of FIG. 3 to that of FIG. 4 requires a valid code to be displayed on the locking instigation means.

FIG. 5 is a schematic and extremely simplified depiction of one exemplary embodiment of the device that forms the subject matter of the invention, for illustrative purposes, in order to explain the principles of operation thereof.

Numerous functionalities have been omitted from these figures in order to make these figures easier to read.

Likewise, in order to simplify the depiction the device is depicted acting on just one pull tab 513 and comprising just one code wheel 521.

In FIG. 5A, the device is depicted in simplified form in the locked configuration which, in principle, corresponds to the configuration of FIG. 3.

The lock comprises a casing 500 which casing is fixed, for example connected to a wall of a piece of luggage.

According to this simplified exemplary embodiment, the latch bolt 530 is connected to the cover 520, in this locked configuration, said latch bolt 530 passes through the pull-tab-end eyelet thus locking this pull tab in position.

The upper part of the cover 520 pushed toward the slot 523 housing the pull tab 513 covers said pull tab preventing the latter from being accessed.

On the side of the locking instigation means, the single wheel 521 is halted in translational movement by the casing 500 and it is centered on a sleeve 540.

Said sleeve 540 is in pivoting connection with a shaft 550 known as the ejection shaft.

In this locked configuration, the wheel 521 is rotationally coupled to the sleeve by a dog clutch mechanism using a toothed sector 541 connected to the sleeve, collaborating with an arrangement of complementary shape formed on the face of the code wheel facing said sleeve.

Thus, when the wheel 521, not covered by the cover, is turned about its axis of rotation, this drives the rotation of the sleeve 540.

The sleeve is translationally coupled to the ejection shaft 550 by a coding lug 542 which, in this locked configuration, is housed in a groove 552 of the ejection shaft.

Thus, the ejection shaft 550 is translationally connected to the sleeve 540 which is prevented from translational movement by the wheel 521 which is itself translationally connected to the fixed casing 500, so that if the cover 520 is pushed toward the wheel 521 the cover butts against the ejection shaft 550 which is prevented from translational movement by the coding lug 542, and the cover cannot be moved.

The ejection shaft comprises a slot 553 of which the width is equivalent to that of the coding lug 542.

Thus, when a valid code is displayed on the code wheel 521, namely, according to the example, when the wheel 521 is rotated by 90° in the direction of the arrow 501, the coding lug 541 is aligned with the slot 553, which corresponds to the configuration of FIG. 5B.

In FIG. 5B, in a configuration equivalent to the so-called "engaged" configuration of FIG. 2, as the coding lug of the sleeve 540 is aligned with the slot 553 of the ejection shaft 550, it is possible to push the cover 520 toward the wheel 521 until it covers the latter, the ejection shaft 550 being free to effect a translational movement, at least over the length of the slot 553.

The position of the coding lug, which is not visible in this view, is depicted in dotted line.

As the latch bolt 530 is connected to the cover, it moves in the same direction, almost releasing the locking of the pull tab 513.

In FIG. 5C, in the ejection configuration, the wheel is still displaying the valid code and the cover 520 is pushed even further over, until the end of the slot 553 of the ejection shaft 550 butts against the coding lug.

The latch bolt 530 is then fully extracted from the end eyelet of the pull tab 513 which is easily removed from the slot. The configuration of FIG. 5C is equivalent to the configuration of FIG. 4.

Thus, in order to be able to insert the pull tab in the slot, which is what is being done in the configuration of FIG. 5B, it is necessary for the cover 520 and the latch bolt 530 not to bar access by the pull tab to said slot, something which is possible only if the wheel is displaying a valid (unlocking) code.

As a result, according to this embodiment, it is impossible to lock the pull tab in the lock, and therefore to lock the piece of luggage, if the valid code is not known to the user. This avoids the user locking the piece of luggage inadvertently without knowing it.

The unlocking code is initially set at the factory to a known value, for example 000 on a three-wheel coding system.

In FIG. 5D, the device that forms the subject matter of the invention advantageously comprises a personalization button 590 allowing its user to modify the unlocking code.

The modification of the unlocking code is performed while the device is in a configuration in which the cover uncovers the wheel 521 and in which the wheel is displaying a valid code. For example, if this is the first time the code is personalized, the wheel 521 is in position 0.

The coding lug is aligned with the slot 553 of the ejection shaft 550.

By pressing the personalization button 590, the ejection shaft 550 is pushed toward the slots. During this movement, the coding lug comes into contact with the end of the slot 553 and continuing movement moves the sleeve 540 away from the wheel 521 which is no longer rotationally connected to said sleeve.

All that is then required is for the new valid code to be displayed and then the personalization button 590 released and the new code is thus validated, once the dog clutch mechanism re-establishes the connection between the wheel 521 and the sleeve 540.

In FIG. 6 and FIG. 7, according to one exemplary embodiment, the device that forms the subject matter of the invention reprises the principles of operation set out with reference to FIG. 5, but comprises a more elaborate drive-train in order, on the one hand, to allow the cover 220 a longer travel while at the same time keeping the device compact, and, on the other hand, to make its operation more reliable.

Several return means have been omitted from FIGS. 6 and 7 in order to make these figures easier to read.

Thus, according to this exemplary embodiment, the device comprises three code wheels 321 mounted on sleeves 640 able to rotate and slide on an ejection shaft 650.

The three wheels allow a personalized three-figure unlocking code to be selected by actuating the personalization button 690 according to a procedure similar to that explained with reference to FIG. 5D.

However, unlike the diagrams of FIG. 5, the personalization button 690 is covered by the cover when the latter is in the open, engagement or ejection configuration (FIGS. 1, 3 and 4) and uncovered by the cover when the latter is in the locked configuration (FIG. 3).

Again by analogy with the simplified device depicted in FIG. 5, according to this embodiment of the device that forms the subject matter of the invention, the latch bolt here consists of an assembly of several moving parts.

Thus, the pull-tab-end eyelets (not depicted) are captured, when they are in the slots of the lock, by rotary catches 631.

The movement of said catches between the engagement, locking and ejection configurations of the device is achieved by the translational movement of a fork 632 which acts on the wedge-shaped base of said catches.

The corresponding movements are performed by the user by means of the cover 220, with the exception of the changing of the code, in which the small movement of the fork is the result of the pressure on the personalization button 690.

The cover 220 can be moved only if a valid unlocking code is displayed on the wheels 321, even if said cover is covering said wheels, with the exception of the case in which the TSA lock 325 is being manipulated.

The fork 632 is connected to the cover by a carrier 731 of which the lower tabs fit into cutouts 732 in the fork 632.

The upper tabs 733 of the carrier 731 collaborate with slots made in the cover.

A peg 734 is connected to the cover and to a guide way 735 in order in particular to make it possible to block the code wheels and prevent any unwanted rotation thereof when the cover is moved so as to cover said code wheels.

Thus, in FIG. 8, the cover 220 on its internal face comprises several arrangements which collaborate with elements of the device.

The upper tabs of the carrier thus become inserted in the elongate slots 823 on the internal face of the cover.

Thus, when the upper tabs of the carrier come into contact with the left-hand end G of the slots 823 in the internal face of the cover 220, the movement of said cover toward the slots in the lock moves the carrier, which moves the fork in the direction of locking of the catches.

An arrangement 834 of appropriate form connects the cover in terms of translation with the peg acting on the guide way so that the movement of the cover brings about a movement of the peg and consequently of said guide way.

In FIG. 9, the catches 631 are articulated about a shaft 930 and in their lower part comprise a shape 931 which interacts with the fork 632, in FIG. 6 to move them. They comprise two spurs 932, 933.

The upper spur 932 is able to be inserted in the pull-tab-end eyelet in the configuration of locking of the device.

The lower spur 933 ejects the pull tab from the slot when the device is in the ejection configuration.

FIG. 10A depicts the device (without the cover) in the locked position, the latch bolts 631 are in a configuration in which they block the eyelets of the pull tabs, and the cover is moved in such a way as to uncover the code wheels and cover the pull tabs.

The guide way 735, connected to the cover by the peg 734, is moved in the same direction.

Said guide way comprises a cam 1035 which is able, according to the position of the guide way, to act on a pin 1036, said pin acting on a blocking device 1025 for the blocking of the code wheels.

In the configuration of FIG. 10A, in which the system is locked, the cam 1035 is distant from the pin 1036 and the blocking device 1025 leaves the wheels free to turn and therefore to allow a combination to be displayed.

In FIG. 10B, the device is in the unlocked position, and the cover (not depicted) is pushed so as to cover the code wheels.

In this configuration, the peg 734 pushes the guide way in the direction of the code wheels, the cam 1035 comes into contact with the pin 1036 with the effect of pushing the blocking device vertically toward the wheels and blocking the rotation of the wheels by acting on the sleeves connected to said wheels by a dog clutch mechanism.

Thus, when the cover is pushed over the wheels, there is no risk of the combination displayed on the code wheels changing.

The invention claimed is:

1. A zip fastener device comprising:

at least one slider provided with a pull tab comprising a locking eyelet at its end; a lock comprising locking means able to collaborate with the eyelet of the at least one of the pull tabs so as to secure and release said eyelet with respect to said lock, the locking means for locking the or at least one of the pull tabs comprise a latch bolt comprising a portion able to penetrate into the eyelet of the end of the pull tab and secure said pull tab to the lock, wherein said device comprises locking instigation means to instigate the blocking of the portion of the latch bolt in the eyelet of the pull tab, the lock comprises a cover able to move between a closed position and an open position and able, in the closed position, to cover the end of the at least one of the pull tabs secured to the lock and, in the open position, to uncover this end, said cover being locked in the closed position when the pull tab or tabs are locked in the lock, the cover hides said locking instigation means from view when the cover is in the open position, the locking instigation means comprise a plurality of rotary code wheels and that the latch bolt can be unlocked by a unique combination of positions of said code wheels, known as the valid combination and in that said device comprises blocking means for blocking the rotation of the code wheels by physical contact when the cover is in the open position.

2. The device as claimed in claim 1, wherein the zip fastener comprises two sliders aligned to mirror one another so that moving the two sliders toward one another causes the zip fastener to close, and in that the locking means of the lock are able to collaborate with the eyelets of the pull tabs of each slider, the cover in the closed position covering the ends of the two pull tabs.

3. The device as claimed in claim 1, wherein the cover is a sliding cover configured to pass from the closed position to the open position by sliding along the lock.

4. The device as claimed in claim 1, wherein, when the cover is in the closed position, in a combination of positions of the plurality of rotary code wheels other than the valid combination, the cover is blocked in position.

5. The device as claimed in claim 1, wherein, in the combination of positions of the plurality of rotary code wheels that corresponds to the valid combination, the cover can be moved from the closed position to the open position.

6. The device as claimed in claim 1, wherein the device comprises a slotted ejection shaft and sleeves comprising a coding lug, which is able to slide in a slot of the ejection shaft, the sleeves and the code wheels being centered with respect to the ejection shaft, said sleeves being rotationally coupled to the code wheels by a disengageable dog clutch mechanism.

7. The device as claimed in claim 6, wherein said device comprises a personalization button allowing the dog clutch mechanism between the sleeves and the wheels to be disengaged in order to change the valid combination, said personalization button being covered by the cover in the open position and uncovered by the cover in the closed position.

8. A piece of luggage comprising: a zip fastener device as claimed in claim 1.

* * * * *